United States Patent [19]

Kanchev

[11] 4,316,280
[45] Feb. 16, 1982

[54] COMPENSATOR FOR THE HORIZONTAL ANGULAR ERROR OF A RECORD PLAYER ARM

[75] Inventor: Peter K. Kanchev, Sofia, Bulgaria

[73] Assignee: Bulgarsko Radio, Sofia, Bulgaria

[21] Appl. No.: 155,135

[22] Filed: Jun. 2, 1980

[30] Foreign Application Priority Data

May 31, 1979 [BG] Bulgaria .................................. 43791

[51] Int. Cl.$^3$ ............................................ G11B 21/02
[52] U.S. Cl. .................................................... 369/250
[58] Field of Search .......................................... 369/250

[56] References Cited

U.S. PATENT DOCUMENTS

| 3,850,435 | 11/1974 | Birch | 369/250 |
| 3,920,249 | 11/1975 | Birch | 369/250 |

*Primary Examiner*—Charles E. Phillips

[57] ABSTRACT

A compensator for the horizontal angular error of a record player arm. A first lever is disposed in a horizontal plane beneath the player arm, a first, fixedly positioned bearing supporting an intermediate portion of the first lever so that such lever can rotate in a horizontal plane. The first lever has a bearing on a first end thereof journalling a vertically rotatable shaft upon which the player arm is mounted for limited vertical motion with respect to the arm but so as to rotate horizontally with the vertical shaft. A second lever in the form of a flat horizontal optical mask is affixed to the vertical shaft to rotate therewith, the optical mask having an arch-shaped slit therein which is convex in the direction away from the axis of the vertical shaft. A source of light is disposed close to the optical mask on one side thereof, and two spaced photo-receivers are disposed on the other side of the optical mask. A blind is disposed between the optical mask and two photo-receivers, the blind having a linear slit therein directed radially of the vertical shaft. Electric circuit means connects the two photo-receivers to an electric motor drivingly connected to the first lever so as to energize the motor to drive the first lever constantly to seek a position in which the illuminations of the two photo-receivers are equal.

4 Claims, 1 Drawing Figure

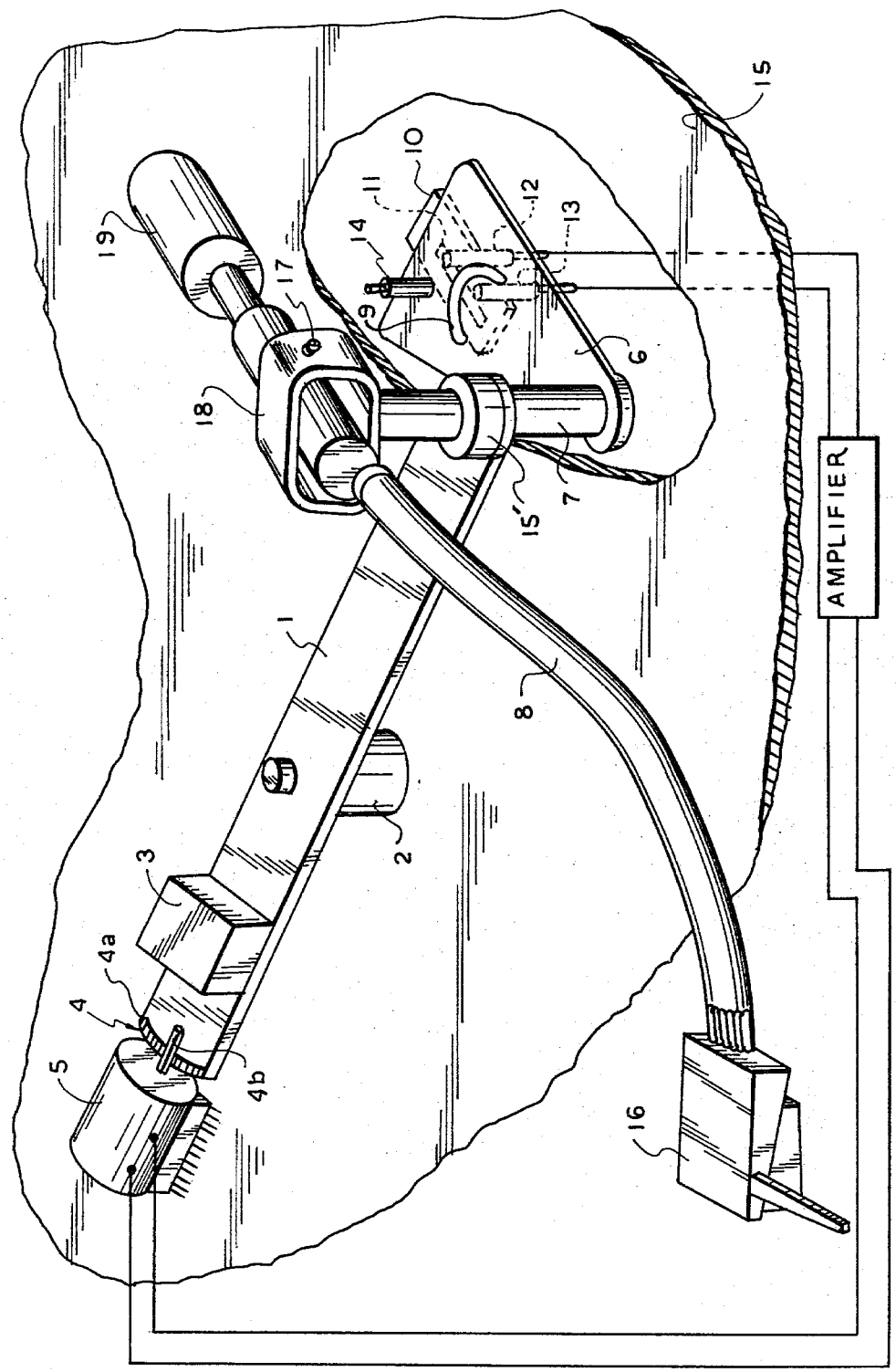

COMPENSATOR FOR THE HORIZONTAL ANGULAR ERROR OF A RECORD PLAYER ARM

This application is related to Kanchev application Ser. No. 155,134, filed June 2, 1980.

This invention relates to a compensator for the horizontal angular error of a record player arm. The compensator of the invention can be applied for the traditional tone arm of a record player in those cases which require the complete elimination of the horizontal angular error resulting from the non-radial movement of the record player pick-up toward the center of the record.

The prior compensator for the horizontal angular error of a record player arm is known; such prior compensator consists of a lever placed in the plane under the record player arm and mounted at its middle on a bearing. One end of the lever is connected to the moving mechanism, while the other end of the lever is connected through a bearing to a straight record player arm, disposed above it, and an additional lever, disposed beneath it. The additional lever is parallel to the record player arm; under the location of the needle of the pick-up a light source is mounted upon the same additional lever. On the outer surface of the platter bearing disc of the record player there is disposed a photo-receiver which is connected through an amplifier to the motor which moves the additional lever to compensate for the horizontal angular error of the record player arm.

The main disadvantages of such known compensator are: its complex construction, the great correctional movements of the parts required, and the necessity of an especially designed straight pick-up arm. In addition to these, complete compensation of the horizontal angular error is not assured, due to the great distance between the light emitter and the light receivers.

Another prior compensator for the horizontal angular error of a record player arm is known: This compensator consists of a lever, placed in a plane under the player tone arm and mounted at its middle on a bearing. One end of the lever is affixed to the bearing for horizontal movement of the record player tone arm, while at the other end of the lever there is mounted a counterbalance. The lever is connected to an electric motor through a reduction gear. Under the tone arm of the record player and perpendicular to the axis about which it moves horizontally, there is fixedly mounted a horizontal flat optical mask having a slit. By one side of the flat optical mask, close to the slit therein, there is placed a source of light, such by the other side of the mask there are fixed two photo-receivers. Both the source of light and the photo-receivers are fixedly mounted on the base frame of the record player.

A disadvantage of such later discussed prior compensator is that its compensation is not very precise due to the diffusion of light from the light source through the slit toward the photo-receivers.

The present invention has among its objects the provision of a compensator for the horizontal angular error of a record player arm with a higher precision of compensation than has been attainable with prior compensators.

The compensator for horizontal angular error of a record player arm in accordance with the invention has a slit in the flat optical mask which is arched-shaped and is convex in a direction away from the vertical axis about which the record player arm locates. Between the flat optical mask and the two photo-receivers there is affixed a blind or second mask, such blind or second mask having a linear slit directed in the direction toward the axis of the vertical shaft about which the pick-up arm rotates horizontally.

The advantages of the compensator for the horizontal angular error of a record player arm in accordance with the invention are as follows:

It can be applied for use with a traditional record player arm; the precision of compensation is improved, such improved compensation is attained without the application of any additional mechanical force to the tip of the reproducing needle mounted on the pick-up on the record player arm; and the system, formed by the lever and the player arm, is completely statically and dynamically balanced.

The compensator of the invention will be more readily understood upon consideration of the accompanying drawing, in which:

The single FIGURE is a schematic view in perspective of a preferred embodiment of compensator for the horizontal angular error of a record player arm in accordance with the invention.

Turning now to the drawing, the compensator there shown has a first lever 1 which is mounted for rotation in a horizontal plane upon a bearing 2 which is affixed to the base frame 26 of a record player. At the left of the bearing 2 there is a counterbalance weight 3 affixed to the lever 1, and at such end of the lever there is affixed a rack gear 4a. A reversible electric motor 5 has a pinion 4b on its shaft, the pinion 4b meshing with the rack gear 4a, the pinion and rack together constituting a reduction gearing 4.

The right-hand end of the lever 1 has a bearing 15′ affixed thereto, bearing 15′ mounting a vertical shaft 7 for rotation therein. On the upper end of the shaft 7 there is affixed a yoke-like fitting 18 in which an intermediate portion of a player arm 8 is disposed and is connected thereto by a horizontal pivot pin 17. A pick-up 16 is affixed to the forward end of the player arm 8. A counterbalance weight 19 is adjustably affixed to the rear end of the player arm 8, as shown.

Affixed to the lower end of the vertical shaft 7 to turn therewith is a flat optical mask 6 disposed in a horizontal plane. An arcuate slit 9 is provided in the optical mask 6, slit 9 being convex in the direction away from the axis of the shaft 7. A stationary blind or mask 10 provided with a linear slit 11 is disposed in a horizontal plane beneath the optical mask 6, the slit 11 being disposed in a horizontal plane through the axis of the shaft and extending radially thereof.

A light source 14 is disposed vertically above the midpoint of the slit 11 in the stationary blind or mask 10. Beneath the blind 10 and in alignment with the slit 11 therein there are disposed two spaced photo-receivers 12 and 13.

The above-described compensator of the invention operates as follows:

As a result of the rotation of the player arm 8 from the outside toward the center of the record being played the shaft 7 and the optical mask 6 affixed thereto rotate in a clockwise direction. The arch-shaped slit 9 of the optical mask 6 moves into a new position, which reduces the illumination of one of the photo-receivers 12, 13, for example 12, in relation to the other photo-receiver 13. The arch-shaped slit 9 of the optical mask 6 and the slit 11 of the blind 10, which are disposed approximately perpendicular to each other, give a dot-shape to the light beam emitted by the light source 14 and thus reduce the diffusion of such light beam on its way to the two photo-receivers 12 and 13. As a result, optimal precision of the optical system consisting of the light source 14, the flat optical mask 6 with the arch-shaped slit 9, the stationary blind 10 with the slit 11 and the photo-receivers 12 and 13 is achieved. This creates a control signal which, after passing through an amplifier as shown, energizes the electric motor, which is mounted on the base frame 15, as shown, the motor 5 moving the lever 1 and in connection with it the record player tone arm 8 for rotation about the vertical axis of the shaft 7. The flat optical mask 6, which rotates with the player tone arm 8, is thus moved in such a way that the two photo-receivers 12 and 13 are again equally illuminated. The rotation of the lever 1 around the bearing 2 moves the shaft 7 so that the distance between the axis of shaft 7 in the center O of the record being played is changed appropriately. The compensation for the horizontal angular error is a result of the controlled optimizing of the distance between the axis of rotation of the shaft 7 and thus of the player arm 8 and the center of the record, thus achieving a zero-angular error of the player arm 8.

Although the invention is illustrated and described with reference to one preferred embodiment thereof, it is to be expressly understood that it is in no way limited to the disclosure of such a preferred embodiment, but is capable of numerous modifications within the scope of the appended claims.

I claim:

1. A compensator for the horizontal angular error of a record player arm, comprising a first lever disposed in the horizontal plane beneath the player arm, a first, fixedly positioned bearing supporting an intermediate portion of the first lever whereby the first lever can rotate in a horizontal plane, the first lever having a bearing on a first end thereof journalling a vertically rotatable shaft, means of the upper end of the shaft mounting the player arm thereon for horizontal movement upon rotation of the shaft while permitting the player arm a degree of free vertical movement with respect to the shaft, an electric motor having a driving shaft, means connecting the driving shaft of the motor to the first lever so that the motor when energized turns the lever about the first bearing, a second lever in the form of a flat horizontal optical mask affixed to the vertical shaft to rotate therewith, the optical mask having an arch-shaped slit therein which is convex in the direction away from the axis of the vertical shaft, a source of light disposed close to the optical mask on one side thereof, two spaced photo-receivers disposed on the other side of the optical mask, a blind disposed between the optical mask and the two photo-receivers, the blind having a linear slit therein directed radially of the vertical shaft, and means connecting the two photo-receivers to the electric motor so as to energize the motor to drive the first lever constantly to seek a position which the illuminations of the two photo-receivers are equal.

2. A compensator according to claim 1, wherein the means connecting the motor to the first lever is constituted by reducing bearing between the motor shaft and the first lever.

3. A compensator according to claim 2, wherein the first lever is a first-class lever, and the reducing gearing connects the motor shaft to the outer end of the arm of the first lever which is remote from the vertical shaft.

4. A compensator according to claim 1, wherein the means connecting the two photo-receivers to the electric motor comprises circuit means including an amplifier.

* * * * *